Figure 1:
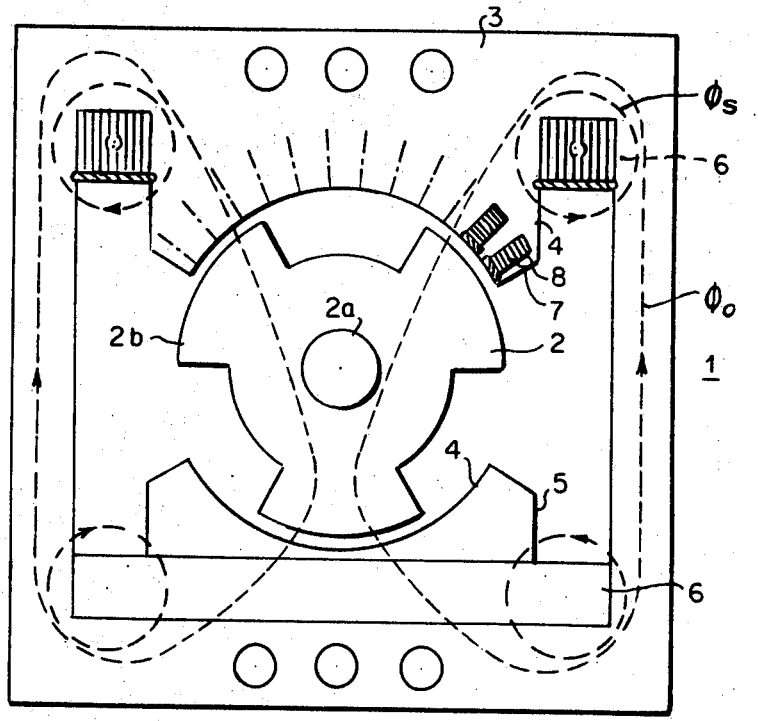

United States Patent
Leitgeb

[15] 3,704,402
[45] Nov. 28, 1972

[54] SPEED CONTROLLED SYNCHRONOUS INVERTER MOTOR

[72] Inventor: Wilhelm Leitgeb, Berlin, Germany

[73] Assignee: Siemens Aktiengesellschaft, Berlin, Munich, Germany

[22] Filed: Feb. 17, 1971

[21] Appl. No.: 116,105

[52] U.S. Cl. ............318/166, 318/186, 318/254, 310/154
[51] Int. Cl. .............................................H02k 19/06
[58] Field of Search............318/138, 166, 186, 254; 310/154

[56] References Cited

UNITED STATES PATENTS

| | | |
|---|---|---|
| 2,986,684 | 5/1961 | Cluwen.....................318/138 |
| 3,375,423 | 3/1968 | Mayer et al...............318/138 |
| 3,384,804 | 5/1968 | Salihi.....................318/138 X |
| 3,454,857 | 7/1969 | Farrand et al............318/166 |

*Primary Examiner*—Gene Z. Rubinson
*Attorney*—Curt M. Avery, Arthur E. Wilfond, Herbert L. Lerner and Daniel J. Tick

[57] ABSTRACT

A speed controlled synchronous inverter motor is supplied from a multiphase alternating-current line of substantially constant frequency and voltage through rectifiers and inverters via a direct-current intermediate circuit. The motor is a medium-frequency machine whose armature winding and excitation winding are both located on the non-rotating part. The excitation winding is connected in series to the direct-current intermediate circuit and works also as a smoothing reactor.

1 Claim, 2 Drawing Figures

PATENTED NOV 28 1972 3,704,402

SPEED CONTROLLED SYNCHRONOUS INVERTER MOTOR

My invention relates to speed controllable inverter motors of the synchronous type. An inverter motor, in the sense here understood, is a synchronous machine which is energized from a direct-current supply through an inverter which, under control by the rotation of the machine shaft, is controlled with respect to its angular position. Such inverter motors have the advantage that their speed is controllable. In the known current inverter motors the direct-current line is often constituted by an alternating-current line to which a controlled or non-controlled rectifier is connected to furnish the required direct current. The satisfactory functioning of such an arrangement makes it necessary to decouple the two alternating-current systems, namely that of the synchronous machine and that of the alternating-current line. Such decoupling, as a rule, is effected by inserting a smoothing choke or throttle into the intermediate direct-current circuit.

This smoothing reactor constitutes an appreciable additional expenditure in space and cost. It is therefore a principal object of my invention to minimize or fully eliminate the necessity of using an additional smoothing reactor.

Another object of my invention is to achieve the advantage that the excitation winding with which such machines are anyhow equipped, is simultaneously utilized for decoupling the two alternating-current systems, without detriment to the efficacy of the excitation winding with respect to its functioning as a series winding.

Still another object of the invention is to eliminate the necessity of applying an additional direct-current source for the excitation winding as in most cases required for speed controllable motors.

To achieve these objects, and in accordance with a feature of my invention, a speed controllable inverter motor of the synchronous type, energized by multiphase alternating current of approximately or substantially constant frequency and voltage through preferably controllable rectifiers and inverters (of the static and preferably solid-state type) is so designed that the synchronous machine is a medium-frequency machine having its armature winding and its excitation winding in the stator, i.e., non-rotating portion, the excitation winding being connected as a series winding in the intermediate direct-current circuit.

This results in the advantage that the excitation winding which in any event is needed in such machines, also operates for decoupling the alternating-current systems without affecting the functioning of the winding as a series winding of the motor proper. The reason why the main inductivity and/or stray inductivity of the excitation winding can be utilized to secure the desired chocking or throttling effect is due to the fact that in the interior of the machine the alternating voltage impressed upon the excitation winding corresponds to the alternating portion of the main flux $\phi_0$ and/or the stray flux $\phi_S$. An additional direct current source for the excitation winding, as required in most cases for speed controllable motors, is also obviated by this connection of the excitation winding as a series winding.

A synchronous machine of the kind described, when used as a current inverter motor, is not capable, however, of being operated at any small speeds—particularly from standstill—without auxiliary devices, because a natural commutation takes place only at speeds at which the cycle duration of the machine currents is small relative to the time constants of the windings. It is therefore advisable to provide machines according to the invention to operate as speed controllable current invertor motors, with a constrained commutation device using capacitors in order to run the motor through the entire desired speed range inclusive of the zero speed. However, at low motor speeds, the commutation of the inverter may also be effected in known manner by having the current in the direct-current intermediate circuit made equal to zero at given time points determined by a corresponding control of the line rectifier. The functioning of the present invention is not affected by such different kinds of commutation of the machine inverter.

The above-mentioned and further objects, advantages and features of my invention, said features being set forth with particularity in the claims annexed hereto, will be mentioned in, and will be apparent from, the following description of an embodiment schematically illustrated in the accompanying drawing by way of example.

Figure 2:
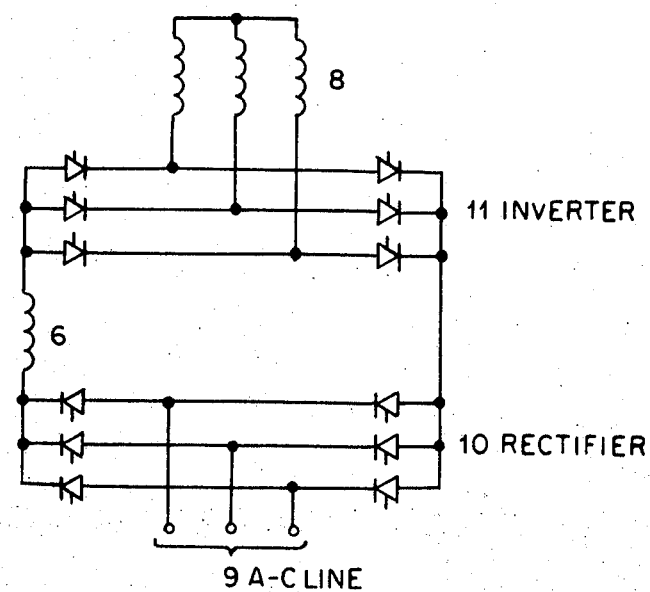

FIG. 1 shows schematically a front view of a synchronous machine particularly favorable for current inverter motors; and FIG. 2 illustrates an example of a circuit connection applicable to the same inverter motor.

The illustrated three-phase current inverter motor shown in FIG. 1 is designed as a synchronous machine 1 which constitutes the reluctance motor whose rotor 2 is free of any windings. The rotor 2 consists of a stack of laminations mounted on the rotor shaft 2a and comprising three lobes or teeth 2b of equal peripheral length which are uniformly distributed about the rotor periphery. Due to the absence of windings on the rotor 2, any slip rings or rotating rectifier arrangements are obviated. The stator 3 of the machine, like the rotor, is composed of a stack of laminations. The machine therefore is deattenuated and, dependent upon a particular design and purpose of the rectifier and inverter, can be operated with a direct flux as well as with alternating flux.

The stator 3 of the machine has two salient excitation poles with respective parallel flanks 5 located opposite each other so that the coils of the excitation winding 6 can readily be placed into the machine. The assembling of the three-phase induced windings 8 into the synchronous machine 1 likewise poses no particular problems because these windings are designed as single-layer coils and are accommodated in open grooves 7. The arcuate width of this three-phase, distributed multiphase winding is chosen equal to the width of the teeth (lobes) 2b of the rotor 2.

As will be seen from FIG. 2, the Y-connected induced winding 8 of the synchronous machine 1 is operated in normal performance of the inverter from the three-phase line 9 through a bridge-type rectifier 10, such as solid-state diodes, and a bridge network 11 of inverters, preferably likewise of the solid state. The rectifier 10 and the inverter 11 are controlled for full conductance. The coils of the excitation winding 6 are connected in the intermediate circuit between the rectifier bridge network 10 and the inverter network 11. By virtue of this particular connection of the excitation winding 6 in the direct-current intermediate circuit, the excitation winding of the motor 1 operates as a series winding and also operates to decouple the two alternating-current systems, namely that of the synchronous machine 1 and that of the alternating-current line. The excitation winding thus performs a double function and obviates any space consuming expedients such as the provision of smoothing chokes or throttles that greatly increase the weight and cost of the assembly.

To those skilled in the art it will be obvious upon a study of this disclosure that my invention permits of various changes with respect to details and mechanical design and circuitry, without departing from the essential features of the invention and within the scope of the claims annexed hereto.

I claim:

1. A speed controllable inverter motor of the synchronous type with circuit means for energizing the motor from a multiphase line of substantially constant frequency and voltage, said energizing circuit means comprising rectifier means and inverter means and an intermediate direct-current circuit between said rectifier means and said inverter means, said inverter motor being a medium-frequency machine having a rotor and a stator, said machine having an excitation winding on said stator, said excitation winding being series connected in said intermediate circuit and forming part thereof.

* * * * *